United States Patent
Takeda et al.

(10) Patent No.: US 7,415,893 B2
(45) Date of Patent: Aug. 26, 2008

(54) BUBBLE GENERATOR FOR USE IN DOPPLER ULTRASONIC FLOWMETER AND DOPPLER ULTRASONIC FLOWMETER

(75) Inventors: Yasushi Takeda, 12-21, Kitahachijo-Nishi 5-chome,Kita-Ku, Sapporo-Shi (JP); Michitsugu Mori, Tokyo (JP); Kenichi Tezuka, Tokyo (JP); Hideaki Tezuka, Tokyo (JP)

(73) Assignees: The Tokyo Electric Power Company, Incorporated, Tokyo (JP); Yasushi Takeda, Sapporo-shi (JP)

( * ) Notice: Subject to any disclaimer, the term of this patent is extended or adjusted under 35 U.S.C. 154(b) by 0 days.

(21) Appl. No.: 10/558,192
(22) PCT Filed: May 26, 2004
(86) PCT No.: PCT/JP2004/007721
  § 371 (c)(1),
  (2), (4) Date: Oct. 16, 2006
(87) PCT Pub. No.: WO2004/106862
  PCT Pub. Date: Sep. 12, 2004

(65) Prior Publication Data
  US 2007/0161901 A1    Jul. 12, 2007

(30) Foreign Application Priority Data
  May 28, 2003    (JP) .............................. 2003-151588

(51) Int. Cl.
  *G01F 1/20*    (2006.01)
(52) U.S. Cl. .................................... 73/861.18
(58) Field of Classification Search .............. 73/861.18, 73/861.25, 861.28; 601/2; 165/104.29
  See application file for complete search history.

(56) References Cited

U.S. PATENT DOCUMENTS

| 5,463,905 | A  |   | 11/1995 | Baird |
| 7,261,144 | B2 | * | 8/2007  | Thome et al. .......... 165/104.29 |
| 2006/0079815 | A1 | * | 4/2006 | Sato et al. ...................... 601/2 |

FOREIGN PATENT DOCUMENTS

| GB | 1 314 521    | 4/1973  |
| JP | 62-049566    | 10/1987 |
| JP | 1-138417     | 5/1989  |
| JP | 6-294670     | 10/1994 |
| JP | 11/295119    | 10/1999 |
| JP | 2003-130699  | 5/2003  |

* cited by examiner

*Primary Examiner*—Jewel V Thompson
(74) *Attorney, Agent, or Firm*—Oblon, Spivak, McClelland, Maier & Neustadt, P.C.

(57) ABSTRACT

A bubble generator to bring out performance of a Doppler ultrasonic flowmeter to the maximum extent is provided.

The bubble generator is provided with a bubble generation member generating bubbles suitable for a predetermined frequency of an ultrasonic pulse emitted into a fluid to be measured and feeding the bubbles into the fluid pipe, and a uniform dispersion member dispersing the bubbles fed uniformly in the pipe, the bubble generator is installed on an upstream side of the fluid pipe with respect to an ultrasonic transducer. The bubble generation member has a Venturi tube, and the uniform dispersion member has a negative pressure generating device, in which the fluid to be measured drawn out by the uniform dispersion member from inside the fluid pipe is returned into the fluid pipe together with the bubbles fed into the fluid pipe via the Venturi tube.

19 Claims, 9 Drawing Sheets

VOLUME OF WATER AND GAS FLOW RATE OF VENTURI TUBE

| VOLUME OF WATER PASSING THROUGH VENTURI TUBE | | GAS FLOW RATE GETTING MIXED | | FLOW RATE OF FLUID TO BE MEASURED |
|---|---|---|---|---|
| Line | Q(l/min) | Pgas(Mpa) | Q(cc/min) | l/min. |
| a | 1.91 | 0.31 | 65 | 1272.7 |
| b | 2.17 | | | 1272.2 |
| c | 2.13 | | | 1272.8 |
| a | 2.06 | 0.3 | 76 | 1276.7 |
| b | 2.17 | | | 1276.6 |
| c | 2.17 | | | 1276.8 |
| a | 2.13 | 0.34 | 78 | 983.76 |
| b | 2.36 | | | 953.41 |
| c | 2.1 | | | 953.74 |
| a | 2.1 | 0.34 | 75 | 632.02 |
| b | 2.13 | | | 631.97 |
| c | 2.21 | | | 631.82 |

※ USED TRANSDUCER IS OF 1MHz AND 2MHz

BUBBLE GENERATOR FOR USE IN DOPPLER ULTRASONIC FLOWMETER AND DOPPLER ULTRASONIC FLOWMETER

TECHNICAL FIELD

The present invention relates to a Doppler ultrasonic flowmeter capable of measuring a flow rate of a fluid to be measured based on a flow velocity distribution in a measurement region instantly on a time-dependant basis, and an art related thereto.

BACKGROUND ART

In Japanese Patent Application Laid-Open No. 2000-97742, there is disclosed a Doppler ultrasonic flowmeter that permits precise, highly accurate and contactless measurement on a time-dependant basis even in the case of a flow in an unsteady state.

Patent document 1: Japanese Patent Application Laid-Open No. 2000-97742.

The Doppler ultrasonic flowmeter disclosed here has a structure as described below. Specifically, it has an ultrasonic transmitting means emitting an ultrasonic pulse of a predetermined frequency from an ultrasonic transducer into the fluid to be measured along a measurement line, a fluid velocity distribution measuring means receiving, out of the ultrasonic pulses emitted into the fluid to be measured, an ultrasonic echo reflected from a measurement region to thereby measure a flow velocity distribution of the fluid to be measured in the measurement region and a flow rate computing means performing an integration on the basis of the flow velocity distribution of the fluid to be measured. The flow rate computing means measures the flow rate based on the flow velocity distribution of the fluid to be measured in the measurement region.

This Doppler ultrasonic flowmeter measures the flow velocity distribution of the fluid to be measured which flows in a pipe, and exhibits an excellent performance in response to the flow rate in a transiting duration in which temporal fluctuations are seen. Further, even at a part in which the flow of the fluid is insufficient or at a place in which the flow is three-dimensional, for example, at a place of the pipe just after it is bent such as of an elbow pipe or a U-shaped inversion pipe, it is possible to measure the flow rate of the fluid to be measured efficiently, highly accurately and instantly. In comparison with conventional ultrasonic flowmeters offered therebefore, as a feature, the Doppler ultrasonic flowmeter can perform the measurement experimental values, empirical values and so forth, being highly evaluated.

Meanwhile, when the above-described Doppler ultrasonic flowmeter measures the flow velocity distribution (flow rate) by taking advantage of a Doppler effect of ultrasonic pulses, reflective bodies are required in the fluid to cause Doppler shifts. When the fluid has no reflective body therein, the measurement is impossible. Still, when the refractive bodies are not mixed into the fluid uniformly, the flow velocity distribution lacks, so that the accurate flow velocity distribution can not be obtained.

When the fluid to be measured is the fluid (for example, water), as a refractive body, a gas having largely different acoustic impedance therefrom such as air or helium is preferable. However, the injection of the gas was performed using a nozzle inserted into the fluid pipe, a sufficient refractive echo intensity could not be obtained unless the gas grows to a size appropriate for the reflection of the ultrasonic waves used for the measurement in the fluid to be measured. Besides, it is impossible to obtain the appropriate flow velocity distribution unless the gas is dispersed uniformly in the emitting direction of the ultrasonic pulses.

An object of the present invention is to provide a measurement technology enabling to measure the flow rate more accurately even under an environment where the contained refractive bodies are not sufficient, by way of uniformly injecting such bubbles into the fluid to be measured that have the size suitable for the predetermined frequency of the ultrasonic pulses.

Therefore, in one embodiment, a bubble generator is used to bring out the performance of a Doppler ultrasonic flowmeter to the maximum extent.

Further, in another embodiment a Doppler ultrasonic flowmeter is provided with a bubble generator to bring out the performance to the maximum extent.

DISCLOSURE OF THE INVENTION

In order to achieve the above-described object, an idea that, when a fluid to be measured is a liquid, bubbles are fed into the fluid to be used as refractive bodies is adopted and means to realize the idea are provided.

One embodiment relates to a bubble generator for use in a Doppler ultrasonic flowmeter, which measures a flow rate of a fluid to be measured and includes an ultrasonic transmitting means to emit an ultrasonic pulse of a predetermined frequency from an ultrasonic transducer into the fluid to be measured in a fluid pipe along a measurement line; a fluid velocity distribution measurement means measuring a flow velocity distribution of the fluid to be measured in a measurement region by receiving, out of the ultrasonic pulses emitted into the fluid to be measured, an ultrasonic echo reflected from the measurement region; and a flow rate computing means calculating the flow rate of the fluid to be measured in the measurement region based on the flow velocity distribution of the fluid to be measured.

The bubble generator includes a bubble generation member generating bubbles suitable for the predetermined frequency of the ultrasonic pulse emitted into the fluid to be measured and feeding the bubbles into the fluid pipe; and a uniform dispersion member to disperse the bubbles fed uniformly in the pipe, in which the bubble generator is installed on an upstream side of the fluid pipe with respect to the ultrasonic transducer.

(Glossary)

The "flow rate computing means" is provided in the Doppler ultrasonic flowmeter, and is the flow rate computing means referred to in the Doppler ultrasonic flowmeter disclosed, for example, in Japanese Patent Application Laid-Open No. 2000-97742. Note that a "Doppler shift method" is a measurement method measuring the flow velocity by applying a principle that the ultrasonic pulse emitted into the fluid flowing in the pipe is reflected by a reflective body (bubble) in the fluid to become an ultrasonic echo, and the frequency of the ultrasonic echo shifts to the extent of the amount in proportion to the flow velocity. The flow velocity distribution signal of the fluid to be measured is transmitted to a computer serving as the flow rate computing means, and the flow velocity distribution signal is integrated here in the radius direction of the pipe, so that the flow rate of the fluid to be measured can be obtained on a time-dependant basis.

The air is commonly used as the "bubbles" fed into the fluid pipe by the "bubble generator", however, there is a case where other gas such as hydrogen is employed depending on the types of the fluid to be measured or the types of measurement. Further, since the gas becomes no use after serving as the reflective bodies, there is a case where a gas capable of melting into the fluid to be measured is employed.

The "bubble suitable for the predetermined frequency of the ultrasonic pulse emitted into the fluid to be measured" means the bubble of which properties such as size, an amount to be fed into the fluid per a unit time, and size of the Venturi tube are within a range appropriate as the reflective body of the ultrasonic pulse. For instance, combinations proved to be appropriate values are shown in a table in FIG. 4.

(Function)

The bubble generation member generates bubbles suitable for the predetermined frequency of the ultrasonic pulse emitted into the fluid to be measured and feeds the bubbles into the fluid pipe. The bubbles fed are dispersed uniformly in the pipe by the uniform dispersion member.

The bubble generator is installed on the upstream side of the fluid pipe with respect to the ultrasonic transducer, so that the bubbles fed and dispersed uniformly in the fluid pipe serve as the reflective bodies of the ultrasonic pulse emitted into the fluid to be measured by the ultrasonic transducer. Therefore, even if no appropriate reflective body exists in the fluid to be measured or the reflective bodies are insufficient, it is possible to use the Doppler ultrasonic flowmeter.

Hereinafter, the description will be given of the flow rate measurement of the fluid to be measured by the Doppler ultrasonic flowmeter. When the ultrasonic pulse is emitted by the transducer of the ultrasonic transmitting means into the fluid to be measured in the fluid pipe along the measurement line, the bubbles uniformly dispersed become the reflective bodies of the ultrasonic wave to thereby emit the ultrasonic echo. The fluid velocity distribution measurement means receives the ultrasonic echo to measure the flow velocity of the fluid to be measured in the measurement region. Based on the flow velocity distribution of the fluid to be measured, the flow rate computing means calculates the flow rate of the fluid to be measured in the measurement region to measure the flow rate of the fluid to be measured.

In one embodiment, the bubble generation member includes a Venturi tube feeding the bubbles into the fluid pipe, and the uniform dispersion member includes a negative pressure generating device installed on the upstream side with respect to the ultrasonic transducer, and in which the fluid to be measured sucked from inside the fluid pipe by the uniform dispersion member is returned into the fluid pipe together with the bubbles fed into the fluid pipe via the Venturi tube.

(Glossary and Function)

The "negative pressure generating device" serves to disperse the bubbles fed uniformly into the fluid pipe by drawing out the fluid to be measured, however, when the fluid to be measured is left to be still drawn out, the flow velocity of the fluid to be measured is forced to slow down. Meanwhile, in the bubble generation member, it is difficult to let the bubbles have an appropriate size by feeding only the air or the like being a material of the bubbles into the fluid to be measured.

Therefore, the "Venturi tube" having a shape capable of narrowing around the center of its flow path in the longitudinal direction is adopted as a member of the bubble generation member. The difference in pressures caused due to the narrowed flow path serves to let the bubbles in the liquid have the uniform size. Further, it is designed to be returned into the fluid pipe together with the bubbles fed into the fluid pipe via the Venturi tube. Therefore, the liquid and gas are mixed in the Venturi tube, and the bubble generation member feeds the bubbles into the fluid to be measured as the liquid mixed with the bubbles, and at the same time, the liquid to feed is designed be the fluid to be measured drawn out by the negative pressure generating device, so that the effect on the fluid to be measured in view of the flow velocity change is designed to be minimum.

In another embodiment, the bubble generation member and the uniform dispersion member are disposed at a section of the fluid pipe being perpendicular to a longitudinal direction of the fluid pipe, and in which the Venturi tube of the bubble generation member is formed such that a center line along an axial direction thereof is perpendicular to a center line along an axial direction of the fluid pipe.

(Glossary and Function)

In order to add a function to mix the bubbles into the fluid to be measured from outside of the fluid pipe, it is rational to set the bubble generator at a joint portion of the fluid pipes. Meanwhile, the fluid pipe, which has plural joint portions in a short distance such that the bubble generation member and the uniform dispersion member can be set at different joint portions respectively, is rare.

Accordingly, the bubble generation member and the uniform dispersion member are designed to be disposed at a section being perpendicular to the longitudinal direction of the fluid pipe, so that the bubble generator can be set at a single joint portion of the fluid pipe. Further, the center line along the axial direction of the Venturi tube is designed to be perpendicular to the center line along the axial direction of the fluid pipe, so that a setting work of the Venturi tube can be performed easily and accurately.

In another embodiment, the number of the pair of the bubble generation member and the uniform dispersion member is set to be two or more, and the respective pairs are placed symmetrically to each other around the pipe.

(Glossary and Function)

When the fluid pipe in which the fluid to be measured flows has a large pipe diameter, it is difficult to disperse the bubbles uniformly in the pipe by a single bubble generation member. Accordingly, the bubble generation member and the uniform dispersion member are provided two or more, respectively, in number, and the respective pairs are formed to position symmetrically to each other around the pipe. With this, even when the fluid pipe has a large pipe diameter, the bubbles are easily dispersed uniformly in the pipe.

Incidentally, it is experimentally proved that, in the case of the pipe having an inside diameter of about 150 mm, the measurement result using three pairs shows little difference from the measurement result using four or more pairs, whereas, in the case of the pipe having an inside diameter of 300 mm or more, around five pairs are more referable.

In another embodiment, the number of types of the Venturi tubes of the bubble generation member is two or more.

(Function)

Since the bubble generator has the plural types of Venturi tubes, it is possible to generate the bubbles which are appropriate for the flow rate measurement by selecting or pairing the appropriate Venturi tube in accordance with the conditions such as the type of the fluid to be measured, the flow velocity, the pipe diameter, and so on.

In another embodiment, the bubble generation member includes a Venturi tube feeding the bubbles into the fluid pipe, the Venturi tube having a fine bubbles generated region of which inside tube diameter is enlarged and a bubbles growing region continuously formed from the fine bubbles generated region toward the fluid pipe.

(Function)

With the high-speed camera, the present inventors have confirmed the fact that, in the Venturi tube, the fine bubbles are generated in the range in which the tube diameter increases, and the bubbles are enlarged from the region in which the fine bubbles are generated toward the fluid pipe (generally, the region in which the tube diameter is constant or increases slowly). Based on this, it is possible to select the length of the fine bubbles generated region in which the tube diameter increases and the length of the bubble growing region in accordance with the bubbles appropriate for the flow rate measurement.

In another embodiment, the bubble growing region is formed to have a variable length structure capable of varying an axial length of the Venturi tube.

The "variable length structure" means, for example, the structure in which the bubble growing region is formed as tubes of a double structure capable of moving the double structured tubes relatively to each other to vary the length of the Venturi tube in the axial direction to vary the length of the bubble growing region.

(Function)

With the variable length structure, the length of the Venturi tube in the axial direction is varied, so that the length of the bubble growing region can be varied. Backed by this, the bubbles can be adjusted appropriately for the flow rate measurement.

Another embodiment includes a data storage means storing axial length data of a bubble growing region and fluid velocity distribution data or measurement result data of flow rate measured by the Doppler ultrasonic flowmeter; an optimal length computing means calculating an optimal axial length based on the data storage means; and an optimal length controlling means controlling the axial length of the Venturi tube in a variable length structure based on the optimal axial length calculated by the optimal length computing means.

(Glossary)

The data storage means may be simply a RAM (random access memory) which temporarily stores data for the calculation by the optimal length computing means, however, a nonvolatile memory such as a hard disk may be provided in addition to the RAM to perform data storage.

(Function)

The data storage means stores the axial length data of the bubble growing region, and the fluid velocity distribution data or the measurement result data of the flow rate, which are measured by the Doppler ultrasonic flowmeter. Based on the data storage means, the optimal axial length is calculated by the optimal length computing means, and the axial length of the Venturi tube in the variable length structure is controlled by the optimal length control section based on the optimal axial length.

With this, the bobbles appropriate for the flow rate measurement can be obtained automatically.

In another embodiment, the Doppler ultrasonic flowmeter includes an ultrasonic transmitting means emitting an ultrasonic pulse of a predetermined frequency from an ultrasonic transducer into a fluid to be measured in a fluid pipe along a measurement line; a fluid velocity distribution measurement means receiving, out of the ultrasonic pulses emitted into the fluid to be measured, an ultrasonic echo reflected from a measurement region to measure a flow velocity distribution of the fluid to be measured in the measurement region; a flow rate computing means calculating a flow rate of the fluid to be measured in the measurement region based on the flow velocity distribution of the fluid to be measured; and a bubble generator having, on the upstream side with respect to the ultrasonic transducer, a bubble generation member generating bubbles being suitable for the ultrasonic pulse of the predetermined frequency in the fluid to be measured and a uniform dispersion member dispersing the bubbles fed uniformly in the pipe, in which the flow velocity distribution is measured using the bubbles generated by the bubble generator to thereby measure the flow rate of the fluid to be measured.

One embodiment describes the Doppler ultrasonic flowmeter in which the bubble generation member has the Venturi tube feeding the bubbles into the fluid pipe and the uniform dispersion member has the negative pressure generating device set on the upstream side with respect to the ultrasonic transducer, and the fluid to be measured drawn out from inside the fluid pipe by the uniform dispersion member is designed to be retuned into the fluid pipe together with the bubbles fed into the fluid pipe via the Venturi tube.

Another embodiment describes the Doppler ultrasonic flowmeter in which the bubble generation member and the uniform dispersion member are disposed at the single section being perpendicular to the longitudinal direction of the fluid pipe, and in which the center line along axial direction of the Venturi tube of the bubble generation member is perpendicular to the center line along the axial direction of the fluid pipe.

Another embodiment describes the Doppler ultrasonic flowmeter in which the number of the pair of the bubble generation member and the uniform dispersion member is two or more, and the respective pairs are placed symmetrically to each other around the pipe.

The Doppler ultrasonic flowmeter including the bubble generator described in another embodiment is the Doppler ultrasonic flowmeter in which the number of types of the Venturi tube of the bubble generation member is two or more.

Another embodiment relates to the Doppler ultrasonic flowmeter further including a bubble capture section capturing the bubbles fed into the fluid pipe by the bubble generation member on a downstream side of the ultrasonic transducer.

Another embodiment relates to the Doppler ultrasonic flowmeter in which the bubble generation member has a Venturi tube feeding the bubbles into the fluid pipe, the Venturi tube being provided with a fine bubbles generated region of which inside tube diameter is enlarged and a bubbles growing region continuously formed from the fine bubbles generated region toward the fluid pipe.

As to the Venturi tube, the Venturi tube may be provided with the bubble growing region formed based on a variable length structure that allows the axial length of the Venturi tube to vary. Further, as described in another embodiment the Venturi tube may be formed by having the optimal length computing means or the optimal length control section controlling the axial length of the Venturi tube of the variable length structure.

(Glossary and Function)

For the Doppler ultrasonic flowmeter, the bubbles fed by the bubble generation member is no use after serving as the reflective bodies of the ultrasonic waves. For the fluid pipe serving to move the fluid to be measured, sometimes, the bubbles had better not to exist or have a trouble when exists. Hence, the bubble capture section is provided to capture the bubbles after serving as the reflective bodies.

Note that the bubble capture section is selected from the conventionally-provided technologies removing the bubbles from the fluid appropriately in consideration of the types of the bubbles fed, the property of the fluid to be measured, and so forth.

BEST MODE FOR CARRYING OUT THE INVENTION

Figure 1:
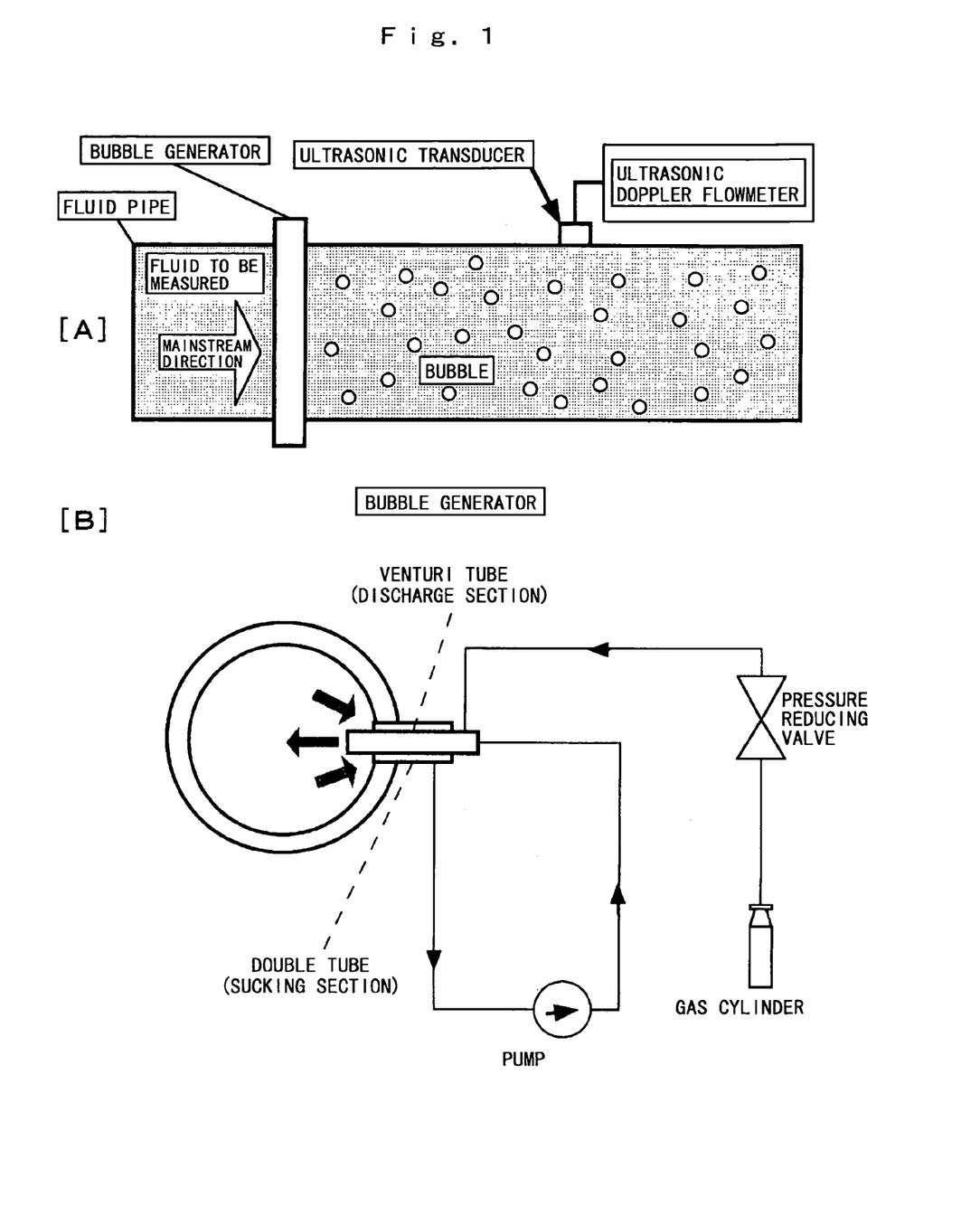
FIG. 1 are schematic diagrams showing a structure of a first embodiment.
Figure 2:
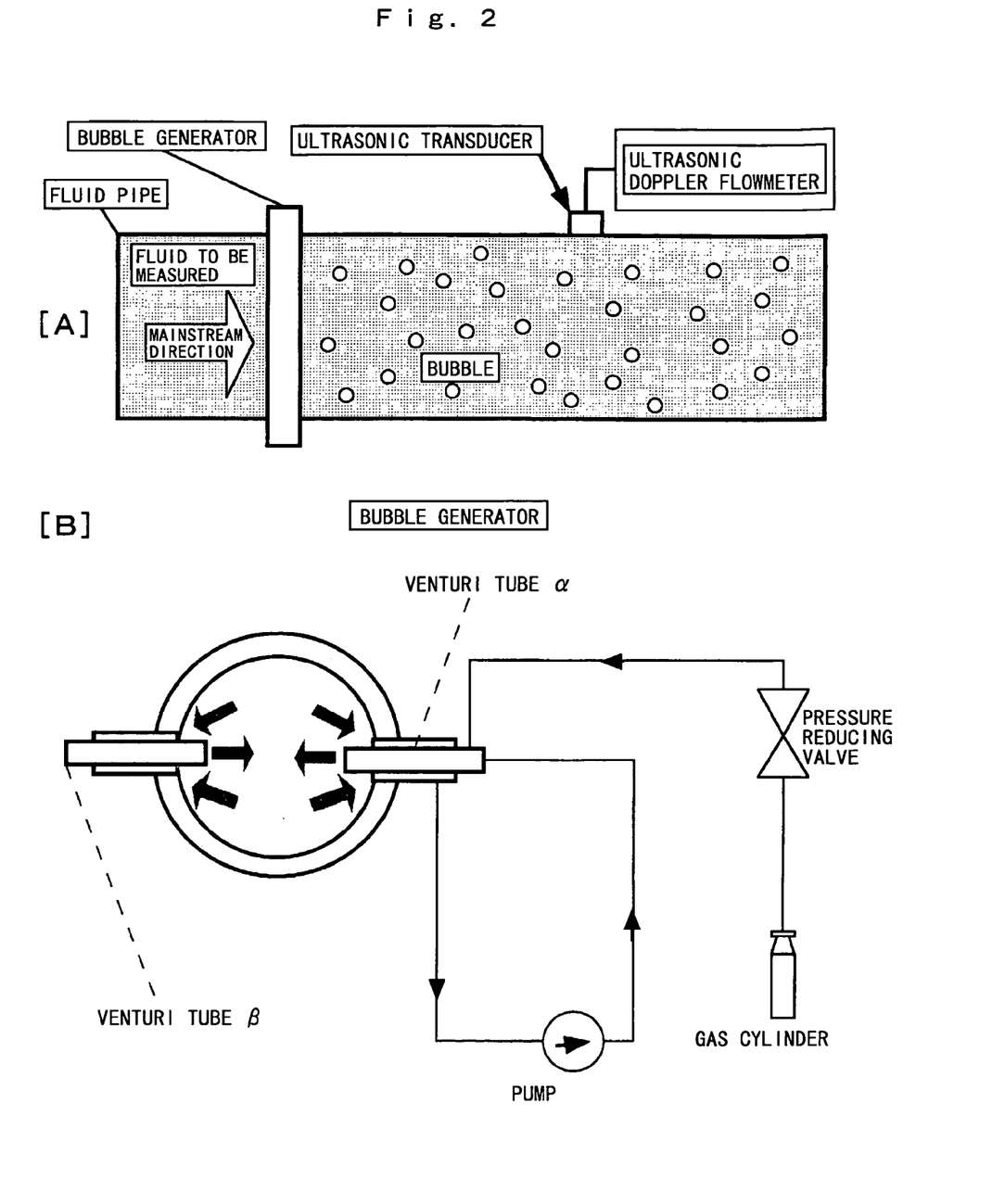
FIG. 2 are schematic diagrams showing the structure of a second embodiment.
Figure 3:
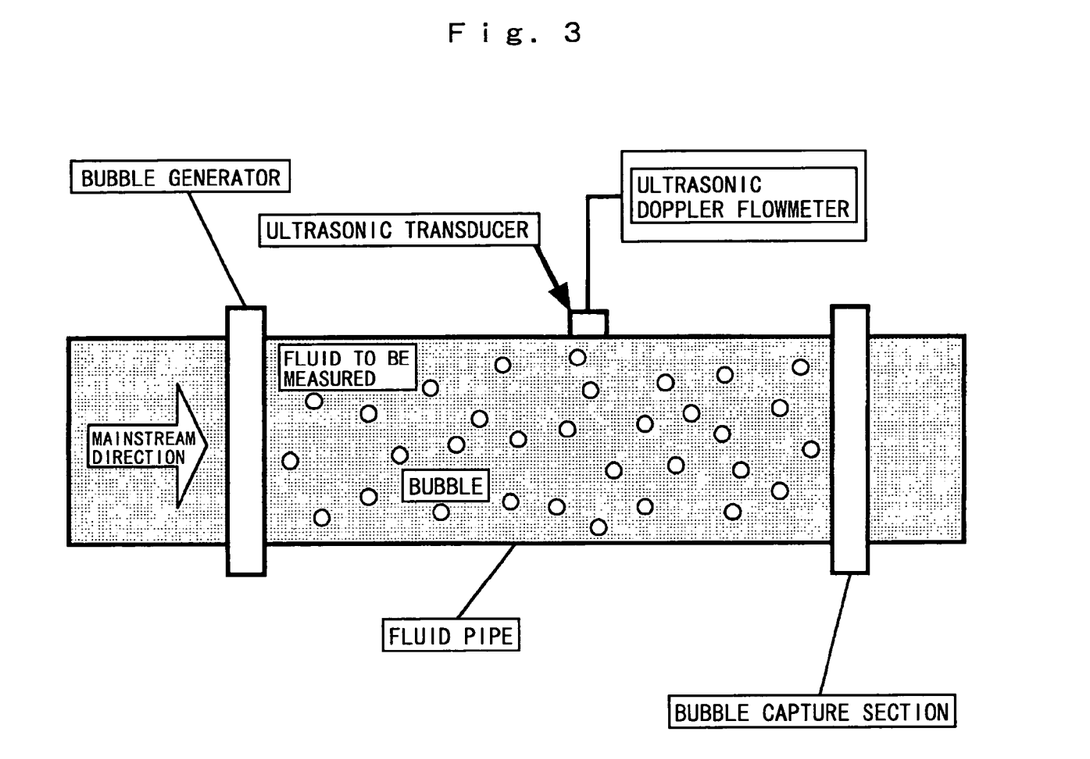
FIG. 3 is a schematic diagram showing a structure of a third embodiment.
Figure 4:
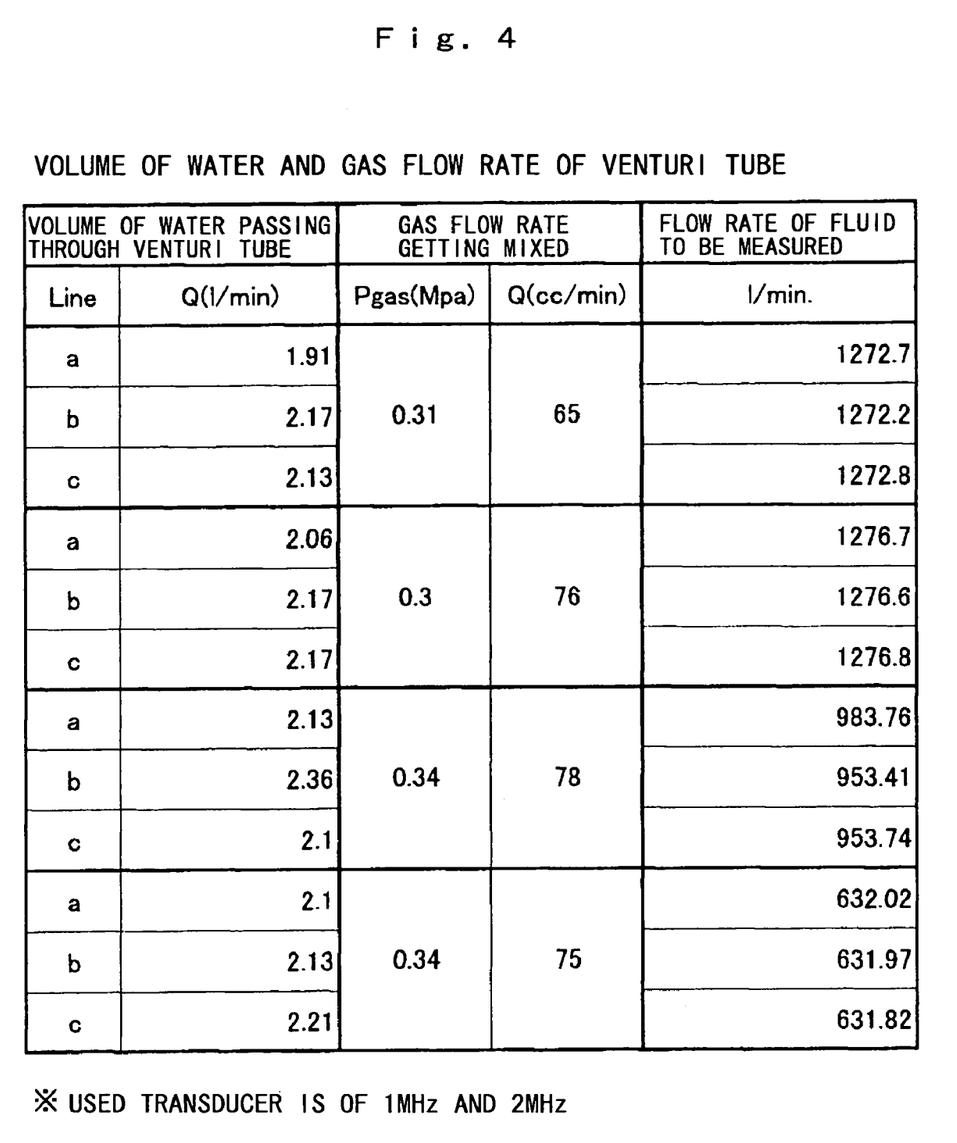
FIG. 4 is a measurement result of a flow rate of a Venturi tube, the flow rate of a gas, and the flow rate of a fluid to be measured.
Figure 5:
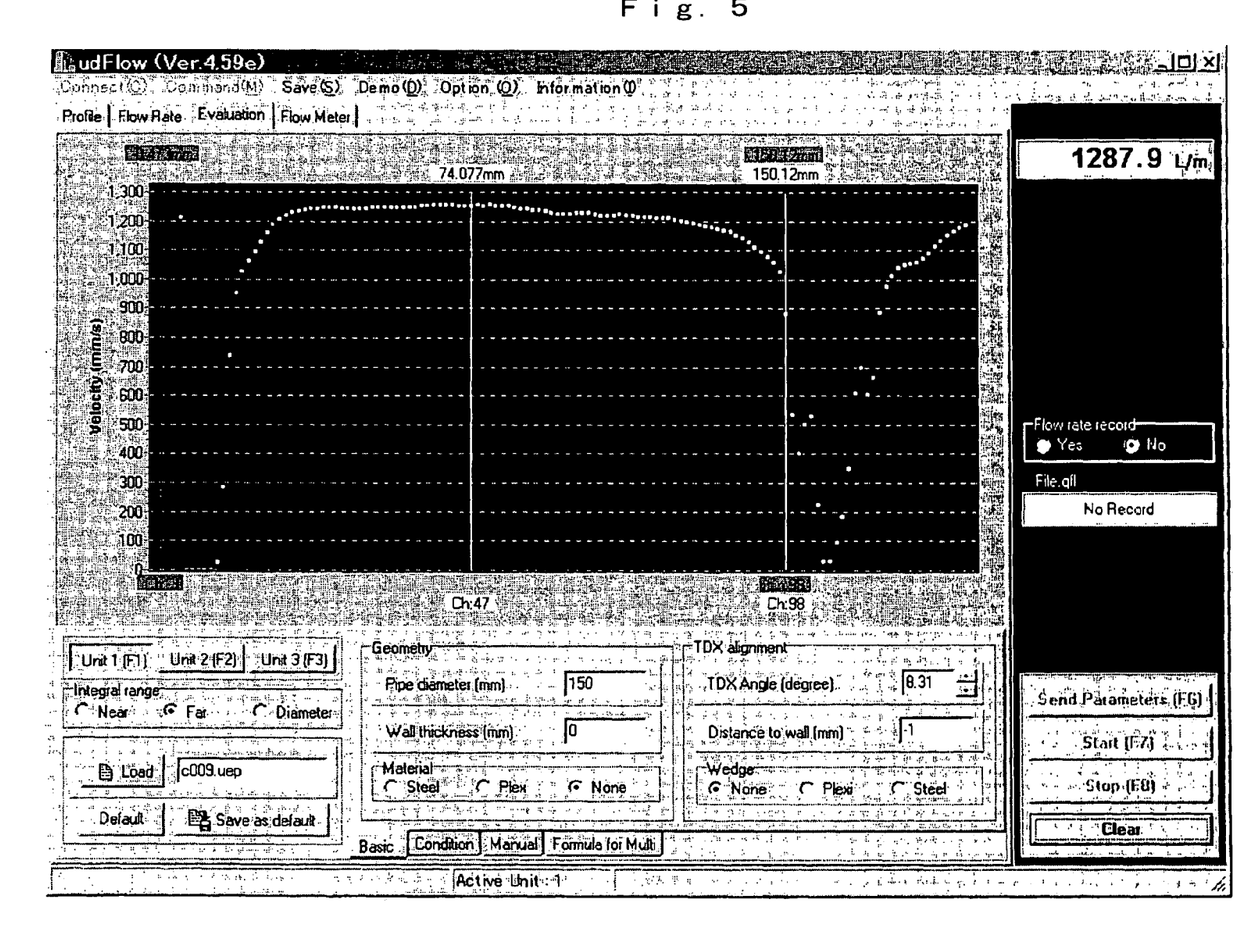
FIG. 5 is a screen showing a flow velocity distribution outputted to a monitor of a computer.
Figure 6:
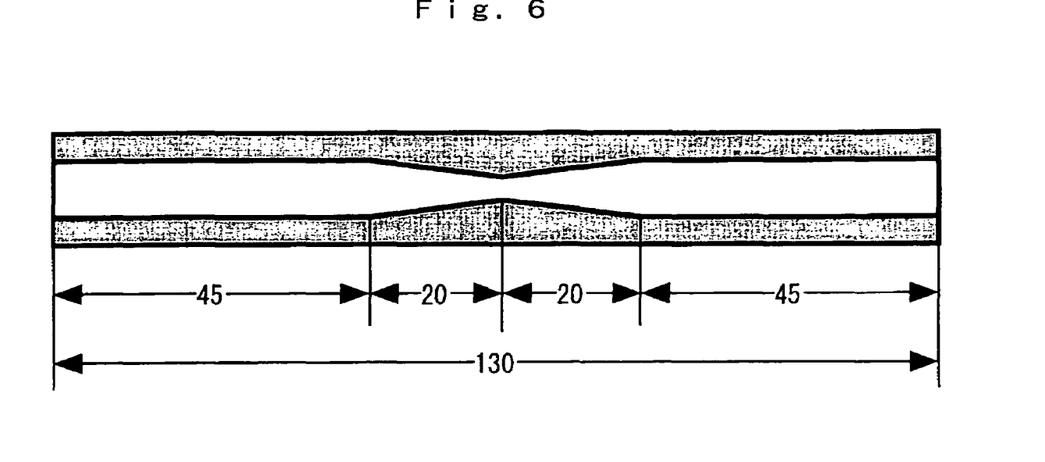
FIG. 6 is a sectional view showing a specific Venturi tube.
Figure 7:
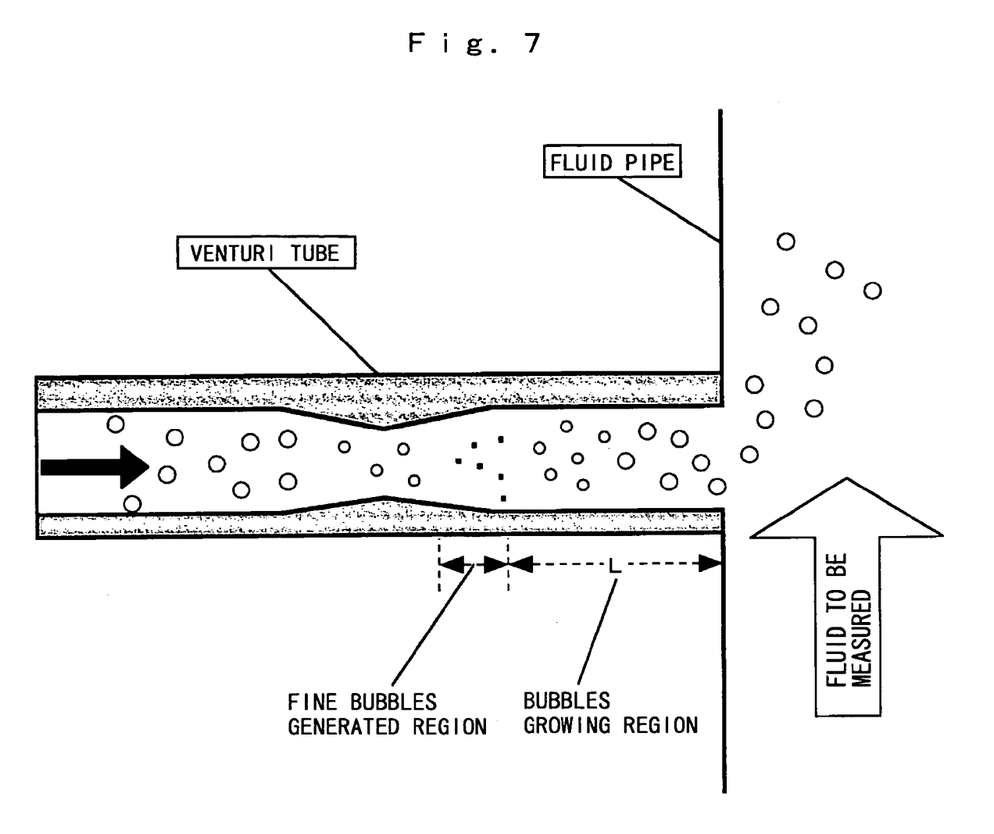
FIG. 7 is a schematic diagram showing a function of the Venturi tube.
Figure 8:
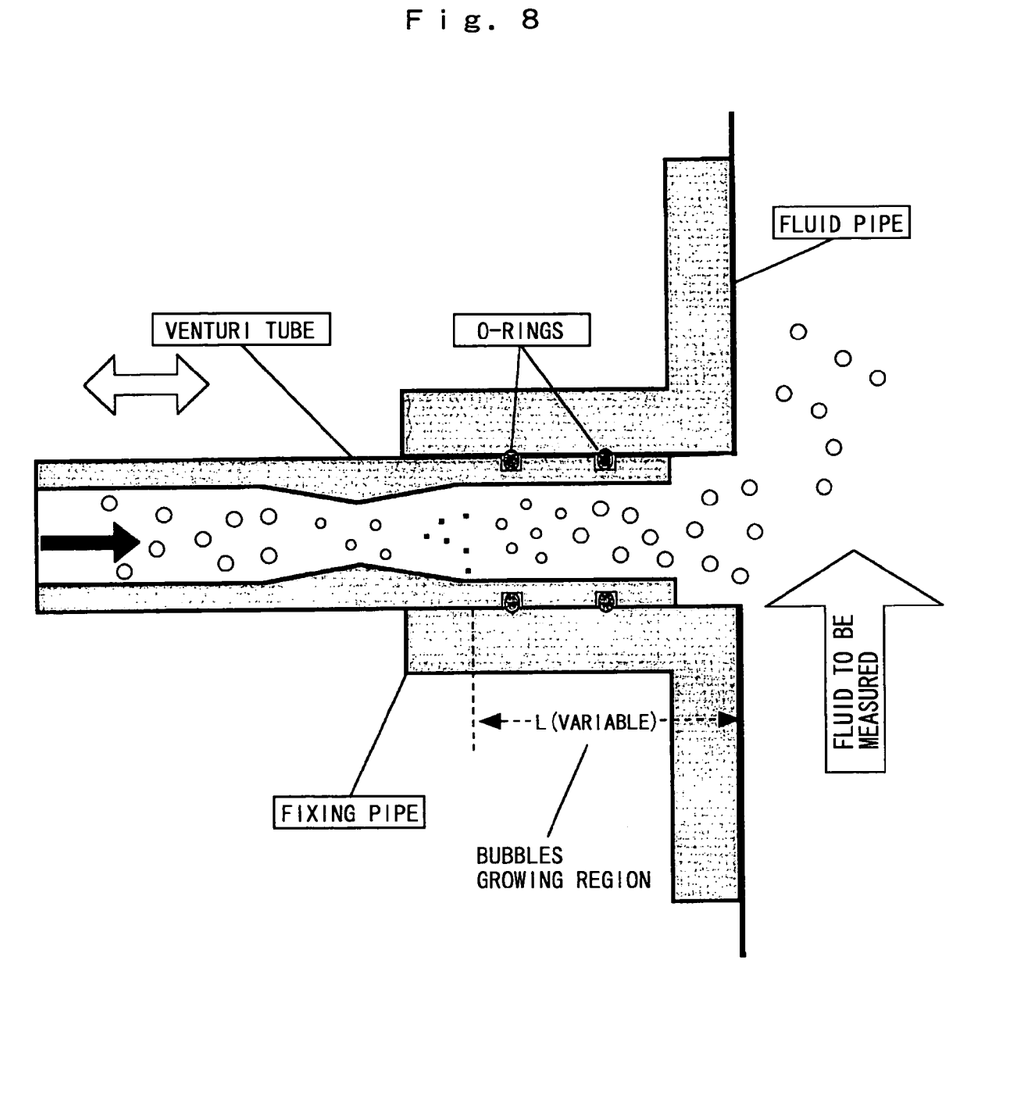
FIG. 8 is a sectional view in the case where an additional function is provided.
Figure 9:
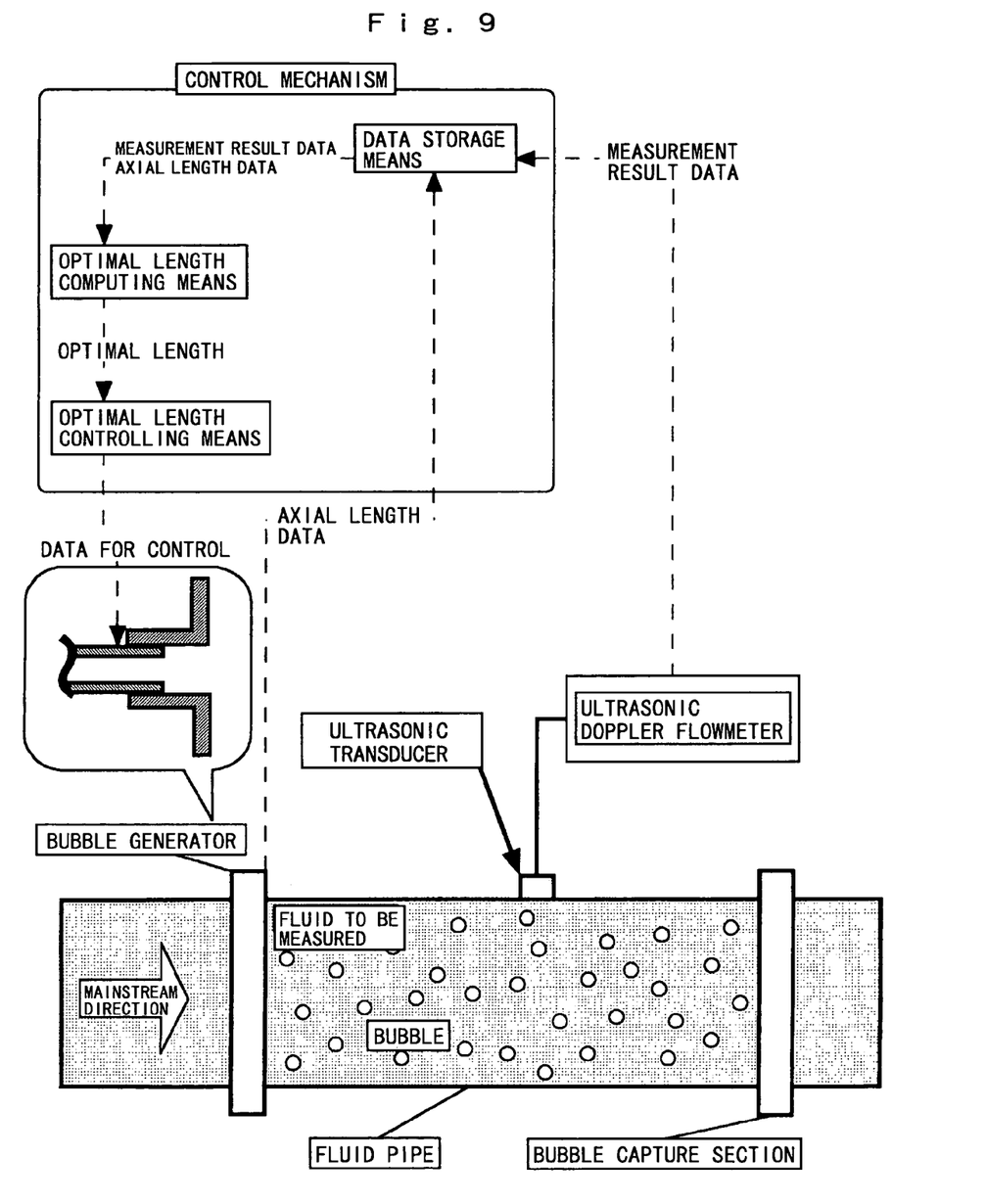
FIG. 9 is a schematic diagram showing a control mechanism with respect to the additional function of the Venturi tube.

Embodiments of a bubble generator and a Doppler ultrasonic flowmeter according to the present invention will be described with reference to the attached drawings. The drawings utilized here are FIG. 1 to FIG. 9. FIG. 1 to FIG. 3 are schematic diagrams showing a structure of the embodiment according to the present invention. FIG. 4 is a table showing a measurement result related to a flow rate of a Venturi tube, a flow rate of a gas and a flow rate of the fluid to be measured. FIG. 5 is a view showing an output screen as to a flow velocity distribution of the fluid to be measured. FIG. 6 is a sectional view of a specific Venturi tube. FIG. 7 is a schematic diagram showing a function of the Venturi tube. FIG. 8 is a sectional view in the case of the Venturi tube provided with an additional function. FIG. 9 is a schematic diagram showing a control mechanism to the additional function of the Venturi tube.

(FIG. 1)

In FIG. 1(A), the case where industrial water flows as a fluid to be measured in a fluid pipe of an inside diameter of 150 mm, and where a Doppler ultrasonic flowmeter and a bubble generator are installed is shown, and details of the bubble generator are shown in FIG. 1(B).

As shown in FIG. 1(A), the bubble generator is placed on an upstream side in the mainstream direction with respect to an ultrasonic transducer of the Doppler ultrasonic flowmeter. As for the Doppler ultrasonic flowmeter, the Doppler ultrasonic flowmeter disclosed in Japanese Patent Application Laid-Open No. 2000-97742 is assumed to be employed and therefore detailed description thereof will be omitted here. The Doppler ultrasonic flowmeter is capable of automatically adjusting and setting a fundamental frequency of a ultrasonic wave oscillated from the ultrasonic transducer by a frequency selecting and setting means within the range from 200 kHz to several MHz (for example, 2 MHz) by 5 kMz.

An ultrasonic pulse of a fundamental frequency of f0 being oscillated along a measurement line from the ultrasonic transducer upon an application of a pulse electrical signal is a linear beam having, for example, a pulse width of about 5 mm and hardly spreading. In the case of an ultrasonic transmitting means having the ultrasonic transducer capable of serving as a transmitter as well as a receiver, an ultrasonic echo of the ultrasonic pulse which is reflected by the refractive body (bubble) in the fluid is designed to be received thereby.

As shown in FIG. 1, the bubble generator is installed at the section of the fluid pipe, the section being perpendicular to an axial direction of the fluid pipe, and has a pair of bubble generation member and uniform dispersion member, which are arranged symmetrically to each other around a center point of the section of the fluid pipe.

The bubble generation member is that functions to generate bubbles suitable for a predetermined frequency of an ultrasonic pulse emitted into the fluid to be measured by the Venturi tube and to feed the bubbles into the fluid pipe. As shown in the drawing, a gas cylinder to supply air being a material of the bubbles at high pressure, a pressure reducing valve to reduce the pressure of the air supplied from the gas cylinder, and the Venturi tube are provided therein. As alternatives to the gas cylinder and pressure reducing valve, an air compressor, a regulator to adjust the air supplied from the air compressor, a first needle valve, a gas flowmeter measuring the flow rate of the air supplied, a second needle valve to adjust the amount of the air supplied to the Venturi tube may be provided. The Venturi tube is formed such that the center line along the axial direction thereof is perpendicular to the center line along the axial direction of the fluid pipe so as to discharge the gas supplied from the gas cylinder to the fluid to be measured in the fluid pipe.

A double tube composing the uniform dispersion member is set so as to cover the Venturi tube so that the fluid in the fluid pipe is sucked through between the inside of the double tube and the outside of the Venturi tube via a pump composing the uniform dispersion member. With this, the bubbles discharged from the Venturi tube can be dispersed uniformly.

(FIG. 6)

As a body of the Venturi tube, that as shown in FIG. 6 is adopted. Specifically, the Venturi tube made of glass having an entire length of 130 mm and an inside diameter of 6 mm, which is narrowed from the points being 45 mm from both the ends and has the narrowest inside diameter (inside diameter of 2 mm) around its center portion in the longitudinal direction. The variation of the inside diameter causes a pressure difference, so that the bubbles fed become minute uniformly. Specifically, the bubbles become fine bubbles of the order of a micron.

(Uniform Dispersion Member)

The uniform dispersion member is a functional section to suck the fluid to be measured in the fluid pipe using the pump as a negative pressure generating device to disperse the bubbles fed by the bubble generation member uniformly in the pipe. The fluid to be measured sucked by the uniform dispersion member from inside the fluid pipe is designed to be returned into the fluid pipe via the Venturi tube together with the bubbles to be fed into the fluid pipe. It is omitted to show in FIG. 1, however, a valve to control the amount of the fluid to be measured sucked by the pump and a flowmeter to measure the sucked amount of the fluid to be measured are provided as well.

Incidentally, the result of a subsidiary experiment, in which three pieces of Venturi tubes, namely (a), (b), (c), are prepared and a suction port is provided at a position being an opposite angle of the Venturi tube in stead of the double tube shown in FIG. 1 (B) to suck, will be shown below. The fluid to be measured sucked by the pump at the opposite angle of the Venturi tube (a) is circulated to the Venturi tube (c), and the fluid to be measured sucked by the pump at the opposite angle of the Venturi tube (c) is circulated to the Venturi tube (a), respectively. The fluid to be measured sucked by the pump at the opposite angle of the Venturi tube is preferably circulated to the Venturi tube at the opposite angle sometimes, whereas when plural pumps having substantially the same sucking amount are in operation, the function of dispersing the bubbles uniformly can be performed. Similarly, in the experiment, the difference between the sucking destinations and the circulating destinations of the pump could not be recognized.

Hereinafter, the description will be given of operations of the above-described bubble generator and the Doppler ultrasonic flowmeter.

The Venturi tube of the bubble generation member generates the bubbles suitable for the predetermined frequency of the ultrasonic pulse emitted into the fluid to be measured, and feeds the bubbles into the fluid to be measured together with the fluid to be measured once drawn out by the pump of the uniform dispersion member. The bubbles fed are dispersed uniformly in the pipe by being sucked by the pump of the uniform dispersion member.

Since the bubble generator is set on the upstream side of the fluid pipe with respect to the ultrasonic transducer, the bubbles fed into the fluid pipe and dispersed uniformly therein serve as reflective bodies of the ultrasonic pulses emitted into the fluid to be measured by the ultrasonic transducer. Therefore, even if there is no appropriate reflective body in the fluid to be measured or the reflective bodies are insufficient, it is possible to use the Doppler ultrasonic flowmeter.

Hereinafter, the description will be given of the flow rate measurement of the fluid to be measured by the Doppler ultrasonic flowmeter. When the ultrasonic pulses are emitted by the transducer of an ultrasonic transmitting means into the fluid to be measured in the fluid pipe along the measurement line, the uniformly dispersed bubbles become the reflective bodies of the ultrasonic waves to transmit the ultrasonic echoes. A fluid velocity distribution measurement means receives the ultrasonic echoes to measure the flow velocity distribution of the fluid to be measured in the measurement region. A flow rate computing means calculates the flow rate of the fluid to be measured in the measurement region based on the flow velocity distribution of the fluid to be measured to thereby measure the flow rate of the fluid to be measured.

(FIG. 4)

As for the measurement result, the description will be given with reference to FIG. 4.

In FIG. 4, a relationship of volume of water passing through the Venturi tube, amount of gas getting mixed in the Venturi tube and the flow rate of the fluid to be measured is shown. The ultrasonic transducer is set to oscillate ultrasonic waves of wavelengths of 1 MHz and 2 MHz, and measurements are performed three times for each case.

In the case where the flow rate is 1272 litters/minute, when the volume of water passing through the Venturi tube is 1.91 litters to 2.17 litters/minute and the mixed gas is 65 cc/minute under 0.31 Mpa, the measurement could be performed with high accuracy.

In the case where the flow rate is 1276 litters/minute, when the volume of water passing through the Venturi tube is 2.06 litters to 2.17 litters/minute and the mixed gas is 76 cc/minute under 0.3 Mpa, the measurement could be performed with high accuracy.

In the case where the flow rate is 950 litters/minute, when the volume of water passing through the Venturi tube is 2.1 litters to 2.36 litters/minute and the mixed gas is 78 cc/minute under 0.34 Mpa, the measurement can be performed with high accuracy.

In the case where the flow rate is 632 litters/minute, when the volume of water passing through the Venturi tube is 2.1 litters to 2.21 litters/minute and the mixed gas is 75 cc/minute under 0.34 Mpa, the measurement can be performed with high accuracy.

(FIG. 5)

In FIG. 5, the flow velocity distribution on the measurement line in the case of the pipe having an inside diameter of 150 mm is shown. The measurement condition is: the gas to be mixed into is 76 cc/minute under 0.3 Mpa.

Since the bubbles as reflective bodies are dispersed almost uniformly, it can be recognized that a smooth waveform without differences in the measurement points can be obtained. Note that the flow rate is indicated as 1287.9 L/m at upper right of the screen, which is different from the figure shown in FIG. 4, because the flow rate changes every second.

(FIG. 2)

An embodiment shown in FIG. 2 prepares, differently from the embodiment shown in FIG. 1, two types of pairs of the Venturi tube and the double tube for sucking in the bubble generation member. Specifically, two types (α, β) of Venturi tubes having different sizes and shapes are prepared, and the double tubes are installed to pair with them, respectively. Thus, a selection of the Venturi tube is enabled in accordance with conditions such as the inside diameter of the pipe, the flow rate of the fluid to be measured, or the like, for use therein.

In FIG. 2, not the Venturi tube (>) but the Venturi tube (a) is selected to measure the flow rate of the fluid to be measured.

(FIG. 3)

An embodiment shown in FIG. 3 relates to a Doppler ultrasonic flowmeter having a bubble capture section at a downstream side with respect to the ultrasonic transducer, the bubble capture section capturing the bubbles fed by the bubble generation member into the fluid pipe.

For the Doppler ultrasonic flowmeter, the bubbles fed into by the bubble generation member are no use after serving as the reflective bodies of the ultrasonic waves. For the fluid pipe serving to move the fluid to be measured, sometimes, the bubbles had better not exist or have a trouble when exist. Hence, the bubble capture section capturing the bubbles after serving as the reflective bodies is provided.

(Supplementary Description about Theory)

In general terms, when relatively large bubbles are mixed into the fluid, possibly, the bubbles do not flow together with the fluid to be measured ("slip") in that the bubbles have buoyant forces and resistances. In that case, the flow velocity practically measured based on the mixed bubbles appears as a value slower than the actual flow velocity. However, the bubbles generated by the bubble generator described in the previously-described embodiment is of the order of a micron, which can be considered to flow at the same flow velocity as of the fluid to be measured.

Additionally, when the amount of babbles which are mixed into increases relatively, the flow rate increases to thereby increase the flow velocity. However, in the previously-described embodiment, the amount of bubble mixed into is 0.1% or below of the fluid to be measured, which is the amount not affecting the measurement accuracy.

Further, when the flow rate circulated by the pump of the bubble generator increases as compared to the flow rate of the fluid to be measured, there is a possibility that an actually measured value is affected thereby, however, in the previously-described embodiment, the flow rate circulated by the pump is enough small as compared to the flow rate of the fluid to be measured, so that the effect is not so large as to affect the measurement accuracy.

(FIG. 7)

FIG. 7 illustrates a fact found by taking a picture of the bubbles inside the Venturi tube by a high-speed camera.

The Venturi tube has the smallest inside diameter around its center in the longitudinal direction. The pressure is the largest around the smallest inside diameter, and the smallest bubbles were generated around just after the smallest inside diameter where the inside diameter is on the increase. In the region having a constant inside diameter after the inside diameter increases to the maximum, the bubbles grew gradually. The region where the small bubbles were generated is shown in the drawing as "fine bubbles generated region" and the region having the constant inside diameter is shown in the drawing as "bubbles growing region".

Thus, on the back of the changing inside diameter of the Venturi tube, the bubbles fed thereinto once become small fine bubbles and then grow gradually and almost uniformly in the bubbles growing region.

(FIG. 8)

In an embodiment shown in FIG. 8, a fixing pipe to couple the Venturi tube which is perpendicular to the flow direction of the fluid to be measured in a fluid pipe is secured and the Venturi tube of which outside diameter is the same as the inside diameter of the fixing pipe is coupled therewith. At a portion of the Venturi tube to embed the fixing pipe, two grooves are formed in the outer periphery and O-rings are secured in the grooves. With this, the length of the bubbles growing region becomes variable.

(FIG. 9)

FIG. 9 conceptually shows an embodiment indicating a mechanism to control the embodiment shown in FIG. 8 capable of varying the length of the bubbles growing region.

The control mechanism includes a data storage means storing an axial length data of the bubbles growing region and a measurement result data of the flow rate measured by the Doppler ultrasonic flowmeter, an optimal length computing means calculating an optimal axial length based on the data storage means, and an optimal length control means controlling the axial length of the Venturi tube of the variable length structure based on the optimal axial length calculated by the optimal length computing means.

The data storage means stores the axial length data of the bubbles growing region and the measurement result data of the flow rate measured by the Doppler ultrasonic flowmeter. Based on the data storage means, the optimal length computing means calculates the optimal axial length, and based on the optimal axial length, an optimal length control section controls the axial length of the Venturi tube of the variable length structure.

With this, it is possible to automatically obtain the appropriate bubbles for the flow rate measurement.

The result of the experiment is simple. Specifically, under a constant ratio of bubbles to volume (for example, 100 ppm), when the diameter and the number of the bubbles are inappropriate, the reflective echo (for example, 1 MHz) cannot be obtained, so that the flow rate measurement is impossible, while when the diameter and the number of the bubbles are appropriate, the flow rate measurement is possible.

In the case where the flow rate measurement is impossible, the flow rate measurement is enabled by controlling the axial length of the Venturi tube by the optimal length control section.

Note that the measurement is possible at the bubble/volume ratio of 20 ppm, at minimum. In addition, it is experimentally recognized that, when the bubble/volume ratio is large, the bubbles of a larger diameter is appropriate for the flow rate measurement.

INDUSTRIAL AVAILABILITY

According to the invention described in Claim 1 to Claim 8, it is possible to provide the bubble generator to bring out the performance of the Doppler ultrasonic flowmeter to the maximum extent.

Further, according to the invention described in Claim 9 to Claim 11, it is possible to provide the Doppler ultrasonic flowmeter having the bubble generator to bring out the performance to the maximum extent.

What is claimed is:

1. A bubble generator used for a Doppler ultrasonic flowmeter, which measures a flow rate of a fluid to be measured and includes ultrasonic transmitting means for emitting an ultrasonic pulse of a predetermined frequency from an ultrasonic transducer into the fluid to be measured in a fluid pipe along a measurement line; fluid velocity distribution measurement means for measuring a flow velocity distribution of the fluid to be measured in a measurement region by receiving, out of the ultrasonic pulses emitted into the fluid to be measured, an ultrasonic echo reflected in the measurement region; and flow rate computing means for calculating the flow rate of the fluid to be measured in the measurement region based on the flow velocity distribution of the fluid to be measured, comprising:

bubble generation means for generating bubbles suitable for a predetermined frequency of the ultrasonic pulse emitted into the fluid to be measured and including a Venturi tube to feed the bubbles into the fluid pipe; and uniform dispersion means for dispersing the bubbles fed uniformly in the pipe and including a negative pressure generating means installed on an upstream side with respect to the ultrasonic transducer, the fluid to be measured sucked from the fluid pipe by said uniform dispersion means is returned into the fluid pipe together with the bubbles fed into the fluid pipe via the Venturi tube, wherein said bubble generator is installed on the upstream side of the fluid pipe with respect to the ultrasonic transducer.

2. The bubble generator according to claim 1, wherein said bubble generation means and said uniform dispersion means are disposed at a section of the fluid pipe perpendicular to a longitudinal direction of the fluid pipe, and wherein the Venturi tube of said bubble generation means is formed such that a center line along an axial direction thereof is perpendicular to a center line of an axial direction of the fluid pipe.

3. The bubble generator according to claim 2, wherein a number of pairs of said bubble generation means and said uniform dispersion means is two or more, and the respective pairs are placed symmetrically to each other around the pipe.

4. The bubble generator according to claim 3, wherein the number of types of the Venturi tubes of said bubble generation means is two or more.

5. The bubble generator according to claim 1, wherein said Venturi tube includes a fine bubbles generated region of which inside tube diameter is enlarged and a bubbles growing region continuously formed from the fine bubbles generated region toward the fluid pipe.

6. The bubble generator according to claim 5, wherein the bubble growing region is formed to have a variable length structure capable of varying an axial length of the Venturi tube.

7. The bubble generator according to claim 6, further comprising:

data storage means for storing axial length data of a bubble growing region and fluid velocity distribution data or measurement result data of flow rate measured by the Doppler ultrasonic flowmeter;

optimal length computing means for calculating an optimal axial length based on said data storage means; and optimal length controlling means for controlling the axial length of the Venturi tube in a variable length structure based on the optimal axial length calculated by said optimal length computing means.

8. A Doppler ultrasonic flowmeter, comprising:
ultrasonic transmitting means for emitting an ultrasonic pulse of a predetermined frequency from an ultrasonic transducer into a fluid to be measured in a fluid pipe along a measurement line;
fluid velocity distribution measurement means for receiving, out of the ultrasonic pulses emitted into the fluid to be measured, an ultrasonic echo reflected from a measurement region to measure a flow velocity distribution of the fluid to be measured in the measurement region;
flow rate computing means for calculating a flow rate of the fluid to be measured in the measurement region based on the flow velocity distribution of the fluid to be measured; and
a bubble generator on an upstream side with respect to the ultrasonic transducer including
bubble generation means for generating bubbles being suitable for the predetermined frequency of the ultrasonic pulse in the fluid to be measured and including a Venturi tube to feed the bubbles into the fluid pipe, and
uniform dispersion means for dispersing the bubbles fed uniformly in the pipe and including a negative pressure generating means installed on an upstream side with respect to the ultrasonic transducer, the fluid to be measured sucked from the fluid pipe by said uniform dispersion means is returned into the fluid pipe together with the bubbles fed into the fluid pipe via the Venturi tube, wherein
the flow velocity distribution is measured using the bubbles generated by said bubble generator to measure the flow rate of the fluid to be measured.

9. The Doppler ultrasonic flowmeter according to claim 8, further comprising a bubble capture section means for capturing the bubbles fed into the fluid pipe by said bubble generation means on a downstream side with respect to the ultrasonic transducer.

10. The Doppler ultrasonic flowmeter according to claim 8, wherein said Venturi tube is provided with a fine bubbles generated region of which inside tube diameter is enlarged and a bubbles growing region continuously formed from the fine bubbles generated region toward the fluid pipe.

11. A Doppler ultrasonic flowmeter, comprising:
an ultrasonic transmitting unit configured to emit an ultrasonic pulse of a predetermined frequency from an ultrasonic transducer into a fluid to be measured in a fluid pipe along a measurement line;
a fluid velocity distribution measurement unit configured to receive, out of the ultrasonic pulses emitted into the fluid to be measured, an ultrasonic echo reflected from a measurement region to measure a flow velocity distribution of the fluid to be measured in the measurement region;
a flow rate computing unit configured to calculate a flow rate of the fluid to be measured in the measurement region based on the flow velocity distribution of the fluid to be measured; and
a bubble generator on an upstream side with respect to the ultrasonic transducer, including
a bubble generation member configured to generate bubbles being suitable for the predetermined frequency of the ultrasonic pulse in the fluid to be measured and including a Venturi tube to feed the bubbles into the fluid pipe, and
a uniform dispersion member configured to disperse the bubbles fed uniformly in the pipe and including a negative pressure generating device installed on an upstream side with respect to the ultrasonic transducer, the fluid to be measured sucked from the fluid pipe by said uniform dispersion member is returned into the fluid pipe together with the bubbles fed into the fluid pipe via the Venturi tube, wherein
the flow velocity distribution is measured using the bubbles generated by said bubble generator to measure the flow rate of the fluid to be measured.

12. The Doppler ultrasonic flowmeter according to claim 11, further comprising a bubble capture section unit configured to capture the bubbles fed into the fluid pipe by said bubble generation member on a downstream side with respect to the ultrasonic transducer.

13. The Doppler ultrasonic flowmeter according to claim 11, wherein the Venturi tube is provided with a fine bubbles generated region of which inside tube diameter is enlarged and a bubbles growing region continuously formed from the fine bubbles generated region toward the fluid pipe.

14. A bubble generator used for a Doppler ultrasonic flowmeter, which measures a flow rate of a fluid to be measured and includes an ultrasonic transmitting unit configured to emit an ultrasonic pulse of a predetermined frequency from an ultrasonic transducer into the fluid to be measured in a fluid pipe along a measurement line; a fluid velocity distribution measurement unit configured to measure a flow velocity distribution of the fluid to be measured in a measurement region by receiving, out of the ultrasonic pulses emitted into the fluid to be measured, an ultrasonic echo reflected in the measurement region; and a flow rate computing unit configured to calculate the flow rate of the fluid to be measured in the measurement region based on the flow velocity distribution of the fluid to be measured, comprising:
a bubble generation unit configured to generate bubbles suitable for a predetermined frequency of the ultrasonic pulse emitted into the fluid to be measured and including a Venturi tube to feed the bubbles into the fluid pipe; and
a uniform dispersion unit configured to disperse the bubbles fed uniformly in the pipe and including a negative pressure generating device installed on an upstream side with respect to the ultrasonic transducer, the fluid to be measured sucked from the fluid pipe by said uniform dispersion unit is returned into the fluid pipe together with the bubbles fed into the fluid pipe via the Venturi tube, wherein
the bubble generator is installed on the upstream side of the fluid pipe with respect to the ultrasonic transducer.

15. The bubble generator according to claim 14, wherein the bubble generation unit and said uniform dispersion unit are disposed at a section of the fluid pipe perpendicular to a longitudinal direction of the fluid pipe, and wherein
the Venturi tube of said bubble generation unit is formed such that a center line along an axial direction thereof is perpendicular to a center line of an axial direction of the fluid pipe.

16. The bubble generator according to claim 15, wherein a number of pairs of said bubble generation unit and said uniform dispersion unit is two or more, and the respective pairs are placed symmetrically to each other around the pipe.

17. The bubble generator according to claim 16, wherein the number of types of the Venturi tubes of said bubble generation unit is two or more.

18. The bubble generator according to claim 14, wherein said Venturi tube includes a fine bubbles generated region of which inside tube diameter is enlarged and a bubbles growing region continuously formed from the fine bubbles generated region toward the fluid pipe.

19. The bubble generator according to claim 14, further comprising:

a data storage unit configured to store axial length data of a bubble growing region and fluid velocity distribution data or measurement result data of flow rate measured by the Doppler ultrasonic flowmeter;

a optimal length computing unit configured to calculate an optimal axial length based on said data storage unit; and a optimal length controlling unit configured to control the axial length of the Venturi tube in a variable length structure based on the optimal axial length calculated by said optimal length computing unit.

* * * * *

UNITED STATES PATENT AND TRADEMARK OFFICE
CERTIFICATE OF CORRECTION

| | | |
|---|---|---|
| PATENT NO. | : 7,415,893 B2 | Page 1 of 1 |
| APPLICATION NO. | : 10/558192 | |
| DATED | : August 26, 2008 | |
| INVENTOR(S) | : Takeda et al. | |

It is certified that error appears in the above-identified patent and that said Letters Patent is hereby corrected as shown below:

On the title page, Item (87), the PCT Publication information is incorrect. Item (87) should read:

-- (87)    PCT Pub. No.:  WO 2004/106862

PCT Pub. Date: Dec. 9, 2004 --

Signed and Sealed this

Twenty-fifth Day of November, 2008

JON W. DUDAS
*Director of the United States Patent and Trademark Office*